(12) United States Patent
Li et al.

(10) Patent No.: US 8,107,247 B2
(45) Date of Patent: Jan. 31, 2012

(54) ELECTRONIC DEVICE

(75) Inventors: Zhan-Yang Li, Shenzhen (CN); Xu Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 363 days.

(21) Appl. No.: 12/558,222

(22) Filed: Sep. 11, 2009

(65) Prior Publication Data

US 2010/0315793 A1 Dec. 16, 2010

(30) Foreign Application Priority Data

Jun. 11, 2009 (CN) .......................... 2009 1 0303154

(51) Int. Cl.
*H01H 9/02* (2006.01)
(52) U.S. Cl. ...... 361/740; 361/747; 361/732; 200/43.18
(58) Field of Classification Search .................. 361/754, 361/732, 747, 740; 200/43.01, 43.13, 43.16, 200/43.18

See application file for complete search history.

(56) References Cited

U.S. PATENT DOCUMENTS

| | | | | |
|---|---|---|---|---|
| 6,101,372 A * | 8/2000 | Kubo | ............................. | 455/558 |
| 6,466,769 B1 * | 10/2002 | Kobayashi et al. | .......... | 455/90.1 |
| 6,524,122 B1 * | 2/2003 | Johnson et al. | ............... | 439/131 |
| 6,618,259 B1 * | 9/2003 | Hood et al. | .................... | 361/740 |
| 6,717,817 B2 * | 4/2004 | Liu et al. | ....................... | 361/737 |
| 7,102,882 B2 * | 9/2006 | Shin | ......................... | 361/679.55 |
| 7,125,258 B2 * | 10/2006 | Nakakubo et al. | .............. | 439/64 |
| 7,708,598 B2 * | 5/2010 | Hu | ................................. | 439/630 |
| 2004/0095731 A1 * | 5/2004 | Takada | .......................... | 361/725 |

* cited by examiner

*Primary Examiner* — Dameon Levi
(74) *Attorney, Agent, or Firm* — Altis Law Group, Inc.

(57) ABSTRACT

An electronic device includes a base, a button module with a button movably received in the base from a lateral side of the base, a sliding block slidably mounted in the base, and an elastic positioning member. The sliding block defines a first securing slot and a second securing slot. The elastic positioning member is capable of engaging in the first securing slot to restrict the sliding block in a first position where the button module is received in the base, and is capable of engaging in the second securing slot to restrict the sliding block in a second position where the button module extends out of the base.

19 Claims, 10 Drawing Sheets

ELECTRONIC DEVICE

BACKGROUND

1. Technical Field

The present disclosure relates to electronic devices, and particularly, to an electronic device with button modules.

2. Description of Related Art

Mobile electronic devices, such as mobile phones, personal digital assistants, etc., are popular communication devices. These mobile electronic devices are integrating more and more functions which require more buttons to activate or use the functions. More buttons generally requires size of the mobile electronic device to increase, which may not be desired.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
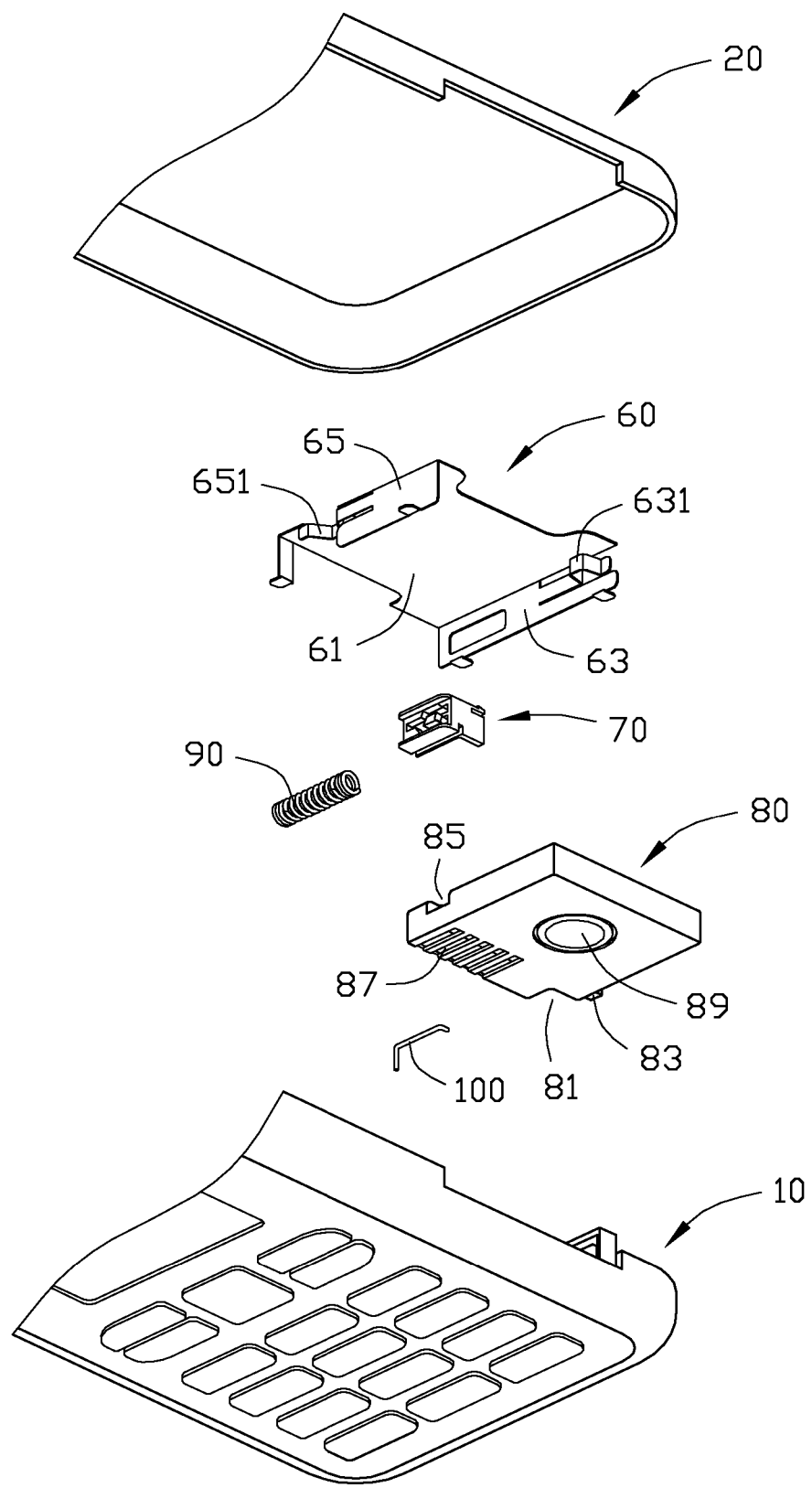
FIG. 1 is an exploded, isometric view of an embodiment of an electronic device.
Figure 2:
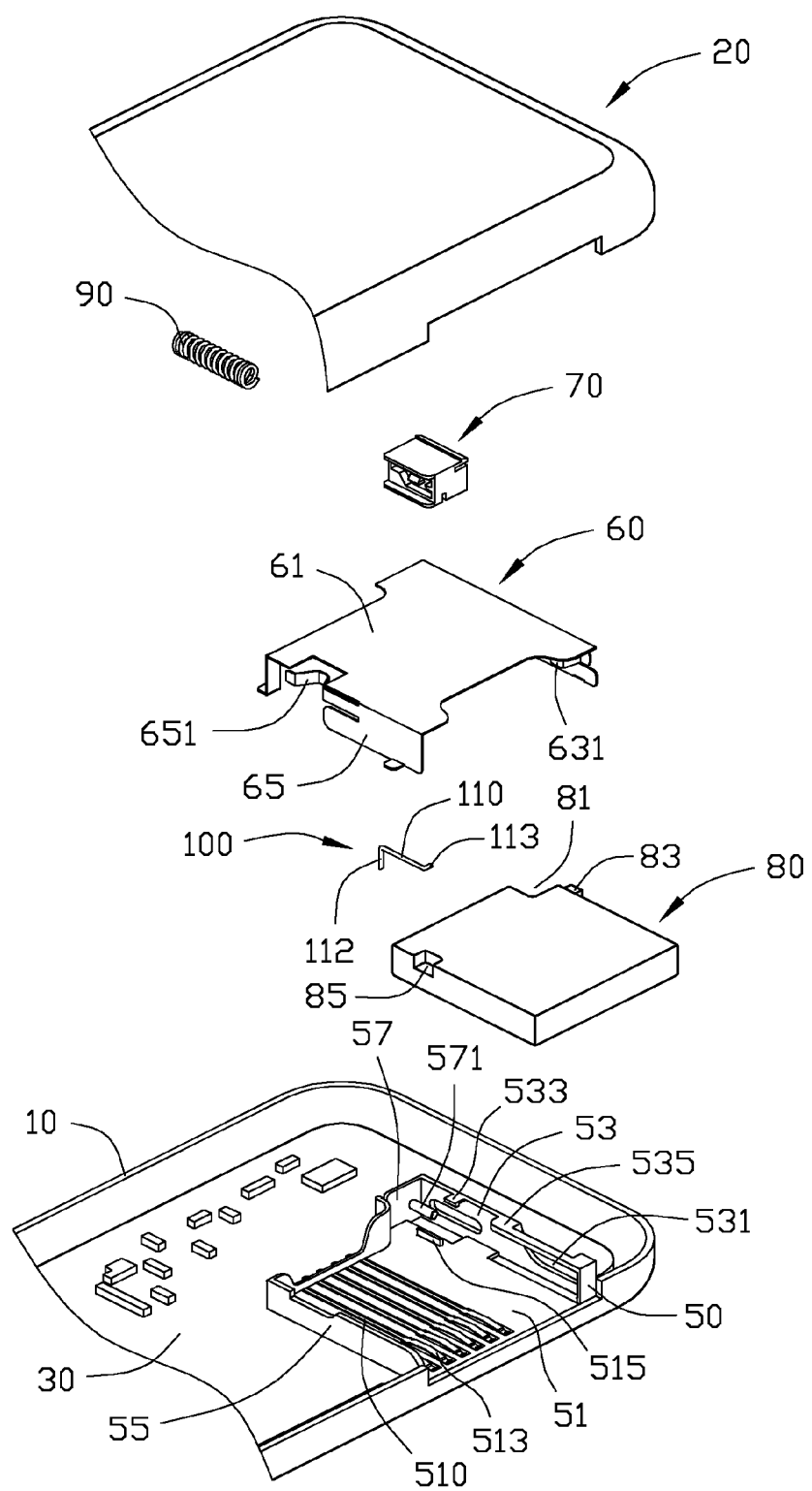
FIG. 2 is similar to FIG. 1, but viewed from another aspect.

Referring to FIGS. 1 and 2, an embodiment of an electronic device includes a base 10 and a cover 20. A circuit board 30 is accommodated in the base 10. A securing bracket 50 is mounted in the base 10. A positioning bracket 60 is secured in the base 10 and covers the securing bracket 50. A sliding block 70 is resiliently received in the securing bracket 50. A button module is movably accommodated between the securing bracket 50 and the positioning bracket 60.

Figure 3:
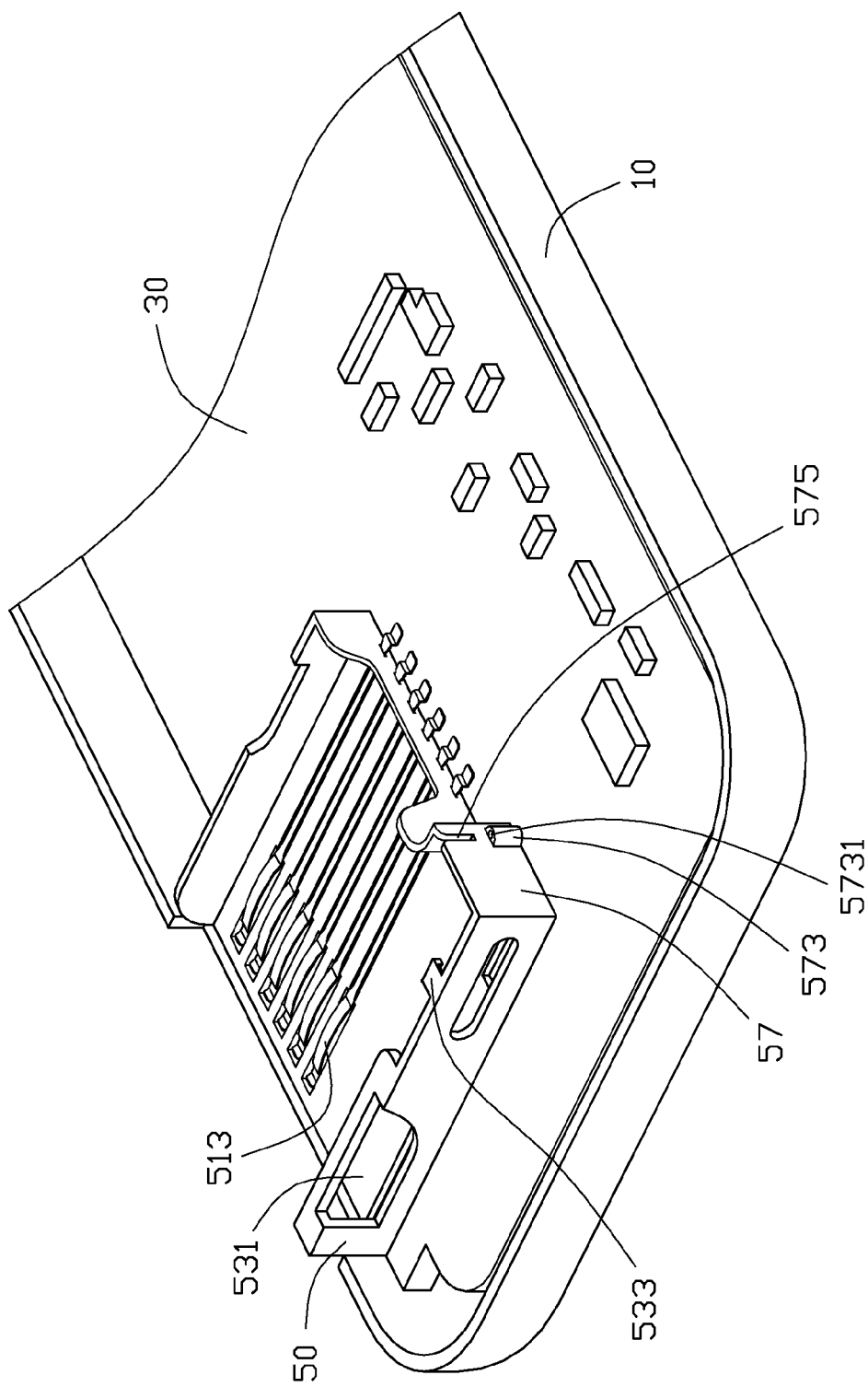
FIG. 3 is a base of the electronic device in FIG. 2, but viewed from another aspect.

The securing bracket 50 includes a bottom wall 51 abutting on the circuit board 30, a first sidewall 53, a second sidewall 55, and a rear wall 57 connected to the first sidewall 53 and the second sidewall 55. A plurality of connecting bars 510 are disposed on the bottom wall 51 adjacent to the second sidewall 55. Each connecting bar 510 has a protruding end 513 close to a side edge of the base 10. A sliding protrusion 515 is formed on the bottom wall 51. The first sidewall 53 defines an opening 531. A blocking bar 535 is formed at a top edge of the first sidewall 53 above the opening 531. A securing hook 533 extends from the top edge of the first sidewall 53. A mounting post 571 extends from the rear wall 57 adjacent to the first sidewall 53. A securing block 573 (see FIG. 3) protrudes from an outside surface of the rear wall 57, and defines a receiving hole 5731. A mounting slot 575 is defined in the rear wall 57 above the securing block 573.

Figure 4:
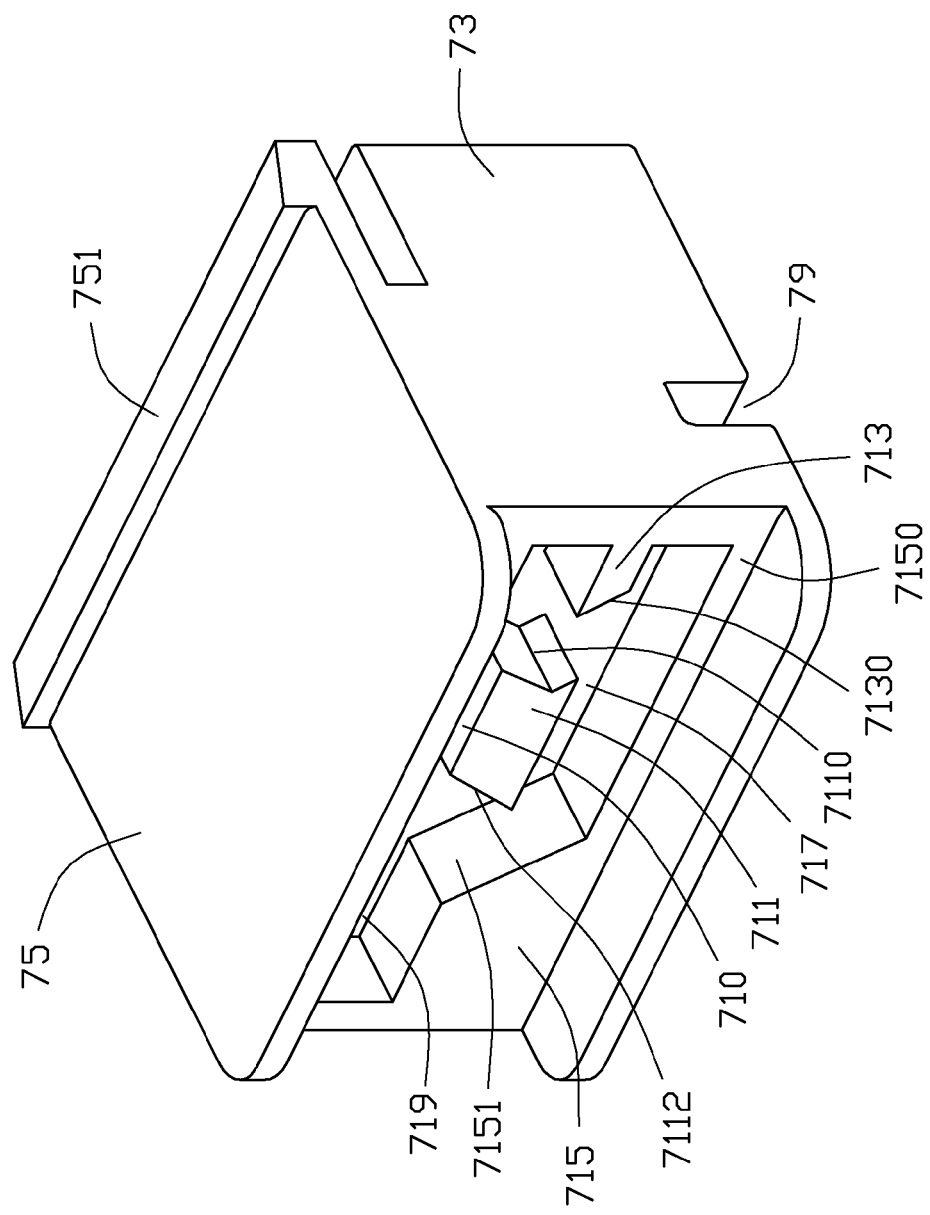
FIG. 4 is an enlarged view of a sliding block of FIG. 2.
Figure 5:
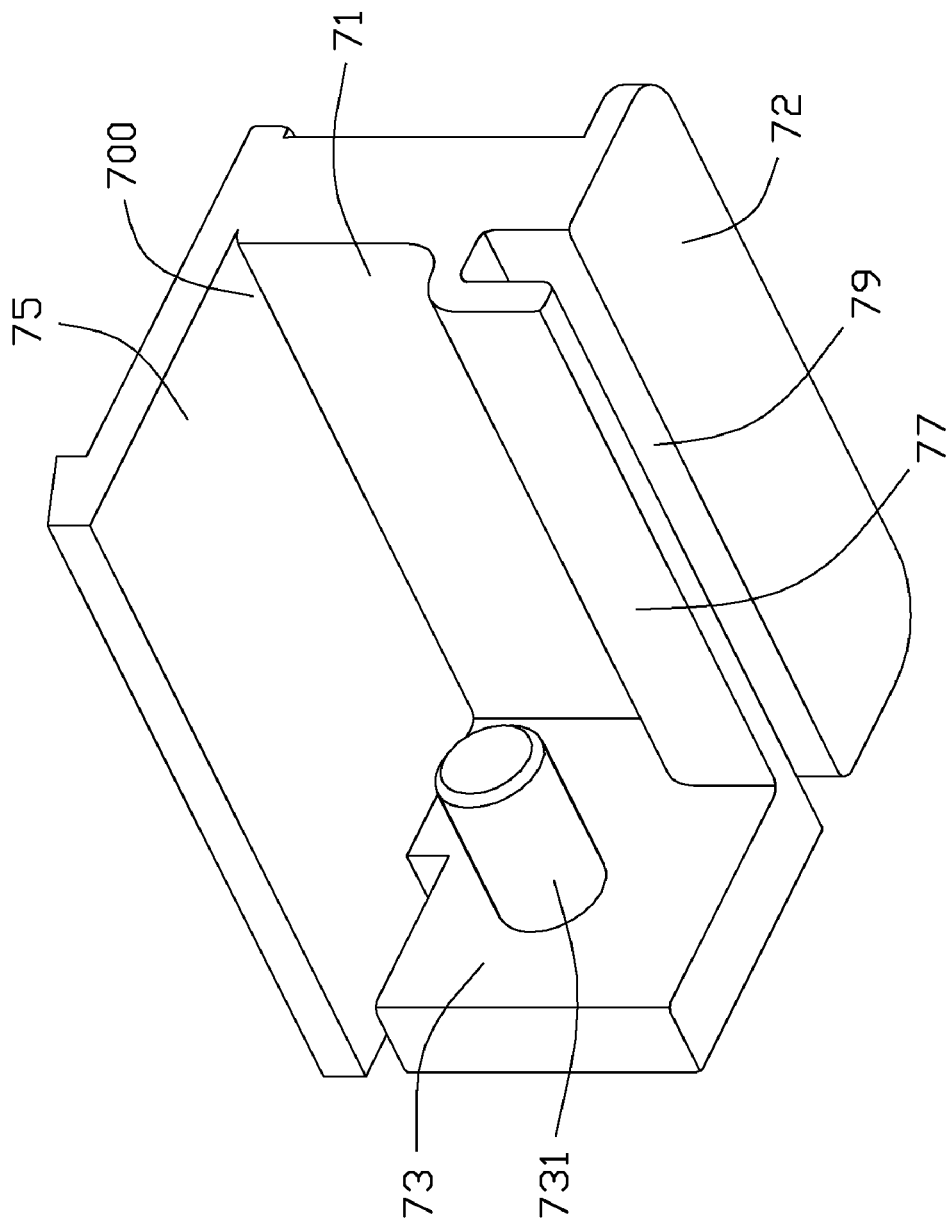
FIG. 5 is similar to FIG. 4, but viewed from another aspect.

Referring to FIGS. 4 and 5, the sliding block 70 includes a sidewall 71 parallel to the securing bracket first sidewall 53, a front wall 73 perpendicular to the sidewall 71, and a top wall 75 perpendicular to the sidewall 71 and front wall 73. The sidewall 71, front wall 73, and top wall 75 cooperatively define a receiving space 700. A bent plate 77 extends down from the sidewall 71. A guiding slot 79 is defined between the bent plate 77 and the sidewall 71 to receive the sliding protrusion 515 on the securing bracket 50. A post 731 protrudes from the front wall 73. A spring member 90 is configured to be accommodated in the receiving space 700, with one end being attached to the securing bracket mounting post 571, and the other end being attached to the sliding block post 731. A blocking flange 751, configured to engage with the sliding block securing hook 533, is formed from the sliding block top wall side edge.

A seat 72 extends from a bottom of the sliding block sidewall 71, and is configured to abut the securing bracket bottom wall 51. A first blocking block 711 protrudes from the sidewall 71. A second blocking block 713 and a third blocking block 715 are located at two sides of the first blocking block 711. At one side of the first blocking block 711, a substantially V-shaped first securing slot 7110 is defined, and a first oblique plane 7112 is defined at the other side opposite to the first securing slot 7110. A first guiding slot 710 is defined between the first blocking block top edge and the sliding block top wall 75. The second blocking block 713 defines a second oblique plane 7130 facing the first securing slot 7110. Oblique directions of the first oblique plane 7110 and the second oblique plane 7130 are reversed. The third blocking block 715 includes a blocking bar 7150 located below the first blocking block 711 and the second blocking block 713. A second guiding slot 717 is defined between the first blocking block 711 and the blocking bar 7150. The third blocking block 715 defines a third oblique plane 7151 which has an oblique direction consistent with the second oblique plane 7130. A second securing slot 719 is defined between the third blocking block top surface and the top wall 75. The first blocking block 711 top surface is higher than the second blocking block 713 top surface and the third blocking block 715 top surface. The second blocking block 713 bottom surface is lower than the first blocking block 711 bottom surface.

The button module 80 is substantially rectangular. A cutout 81 is defined in one corner of the button module 80 to fit the sliding block 70. A blocking protrusion 83 extends from one side of the button module 80 adjacent to the cutout 81, and a notch 85 is defined in an opposite side thereof. A plurality of slots 87 are defined in the button module 80, and are configured to receive the connecting bars 510 in the securing bracket 50, thereby the button module 80 is capable of being electronically coupled to the connecting bars 510. A switch button 89 is disposed at a center of the button module 80.

The positioning bracket 60 includes a top wall 61 covering the securing bracket 50. A first sidewall 63 and a second sidewall 65 perpendicularly extend from two sides of the top wall 61, respectively. A blocking member 631 is formed at the first sidewall 63, and configured to engage with the button module blocking protrusion 83. An elastic positioning member 651 is formed at the second sidewall 65, and configured to engage in the button module notch 85.

The electronic device further includes an elastic positioning member 100. The elastic positioning member 100 has a base 110, a first end 112 perpendicularly bent from the base 110, and a second end 113 opposite to the first end 112.

Referring to FIGS. 6-10, in assembly, the securing bracket sliding protrusion 515 inserts in the sliding block guiding slot 79. The securing bracket securing hook 533 engages with the sliding block blocking flange 751. One end of the spring member 90 is attached to the sliding block post 731, and the other end of the spring member 90 is secured to the securing bracket mounting post 571. The elastic positioning member first end 112 inserts into the securing block receiving hole 5731. When the elastic positioning member second end 113 engages in the first securing slot 7110, the spring member 90 is in a depressed state; when the elastic positioning member second end 113 engages in the second securing slot 719, the spring member 90 is in a normal state.

Figure 6:
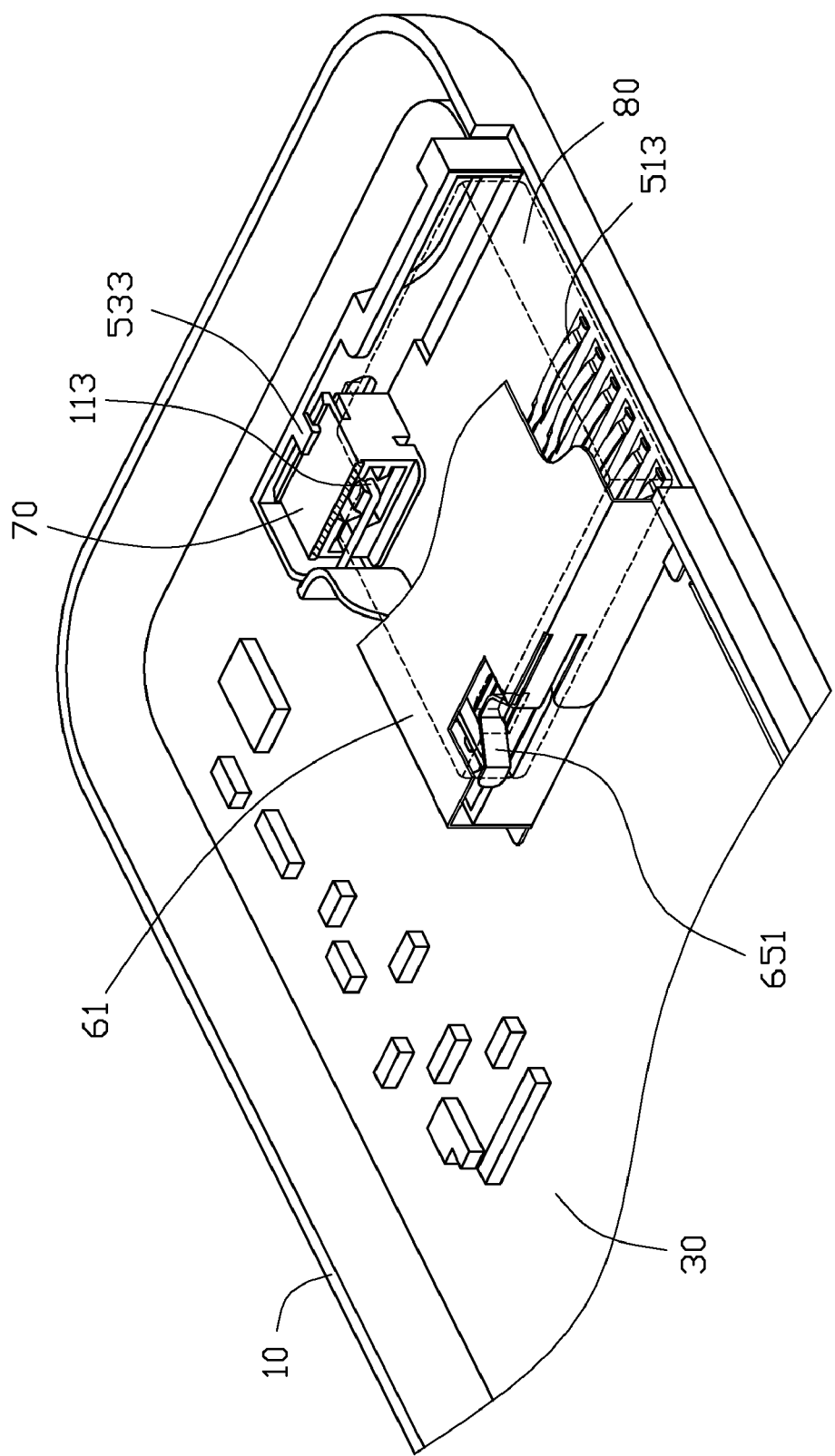
FIG. 6 is an assembled view of FIG. 2, with a cover removed, and a positioning bracket shown in broken lines.
Figure 7:
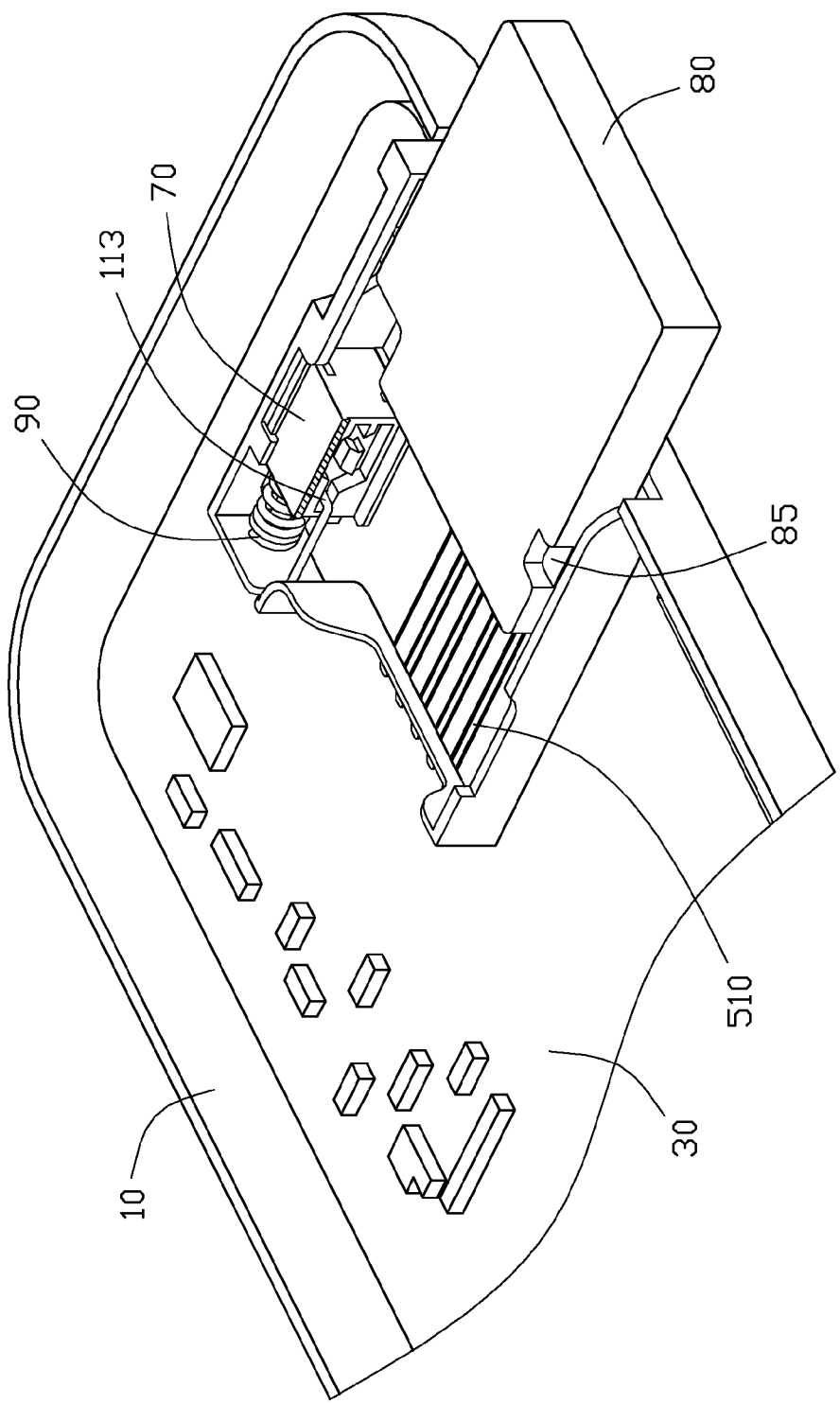
FIG. 7 is similar to FIG. 6, but with the positioning bracket removed, and a button module extending out of the base.
Figure 8:
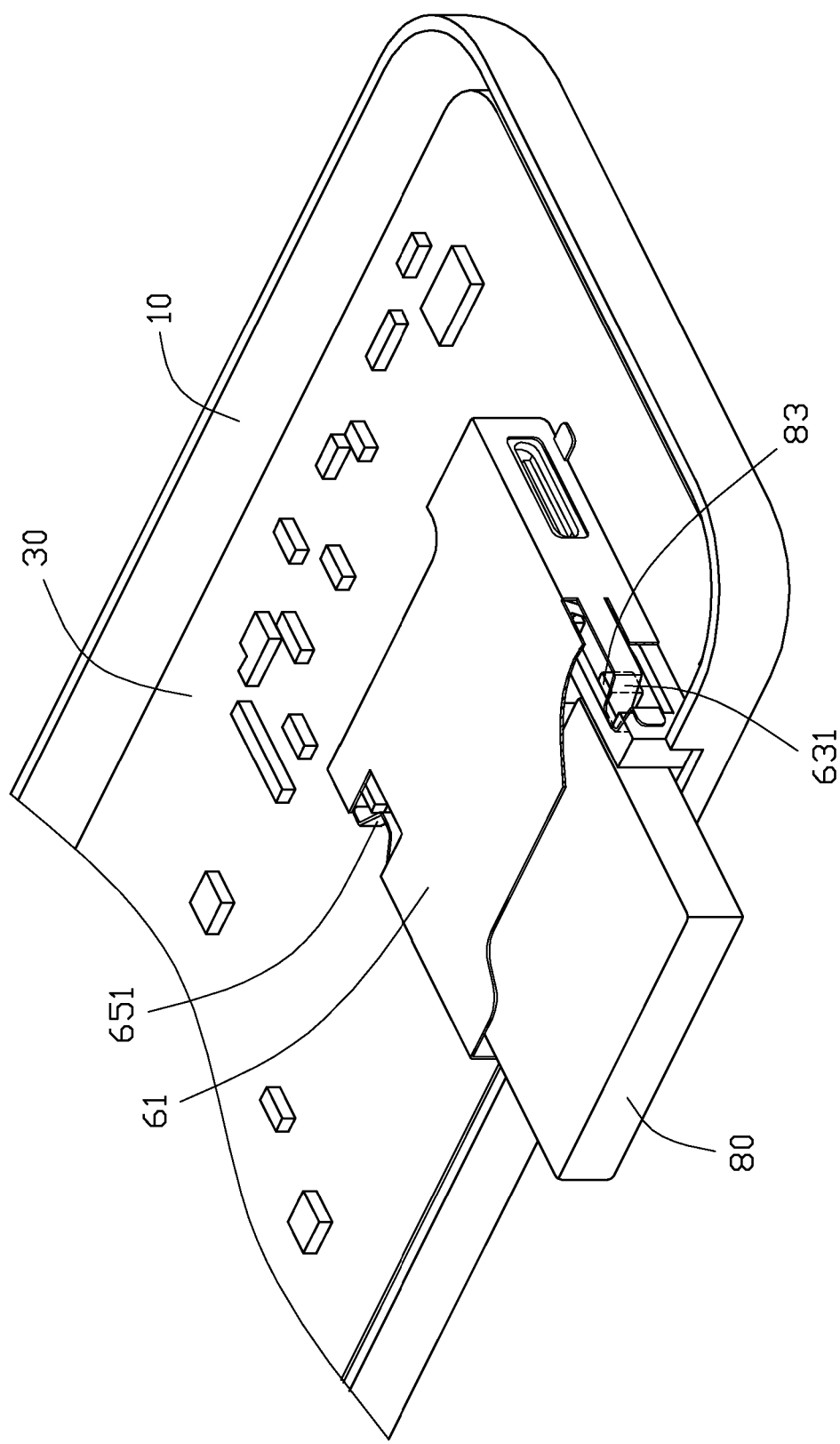
FIG. 8 is similar to FIG. 6, but viewed from another aspect.
Figure 9:
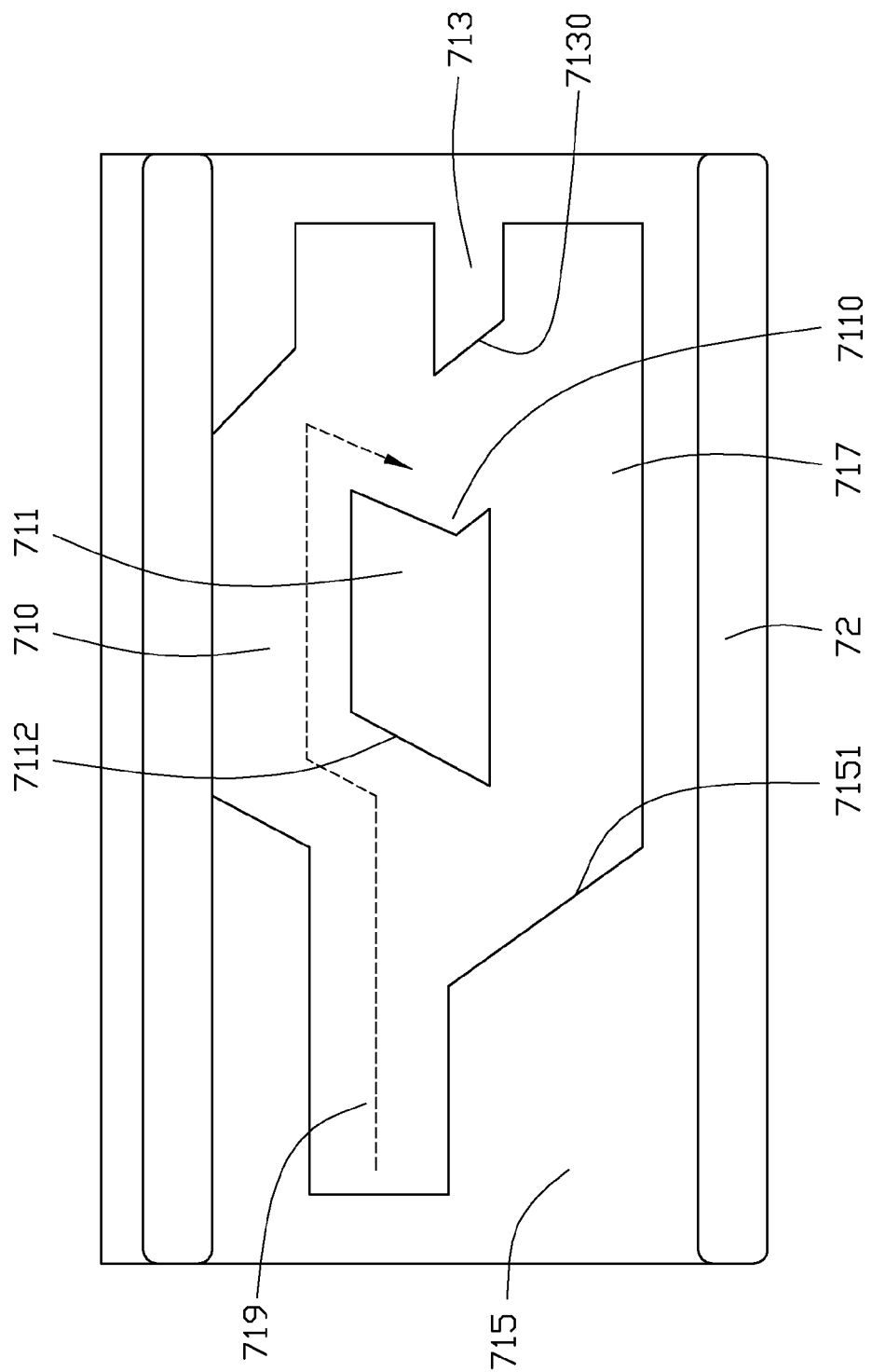
FIG. 9 is a side view of the sliding block showing a first moving path of an elastic positioning member.
Figure 10:
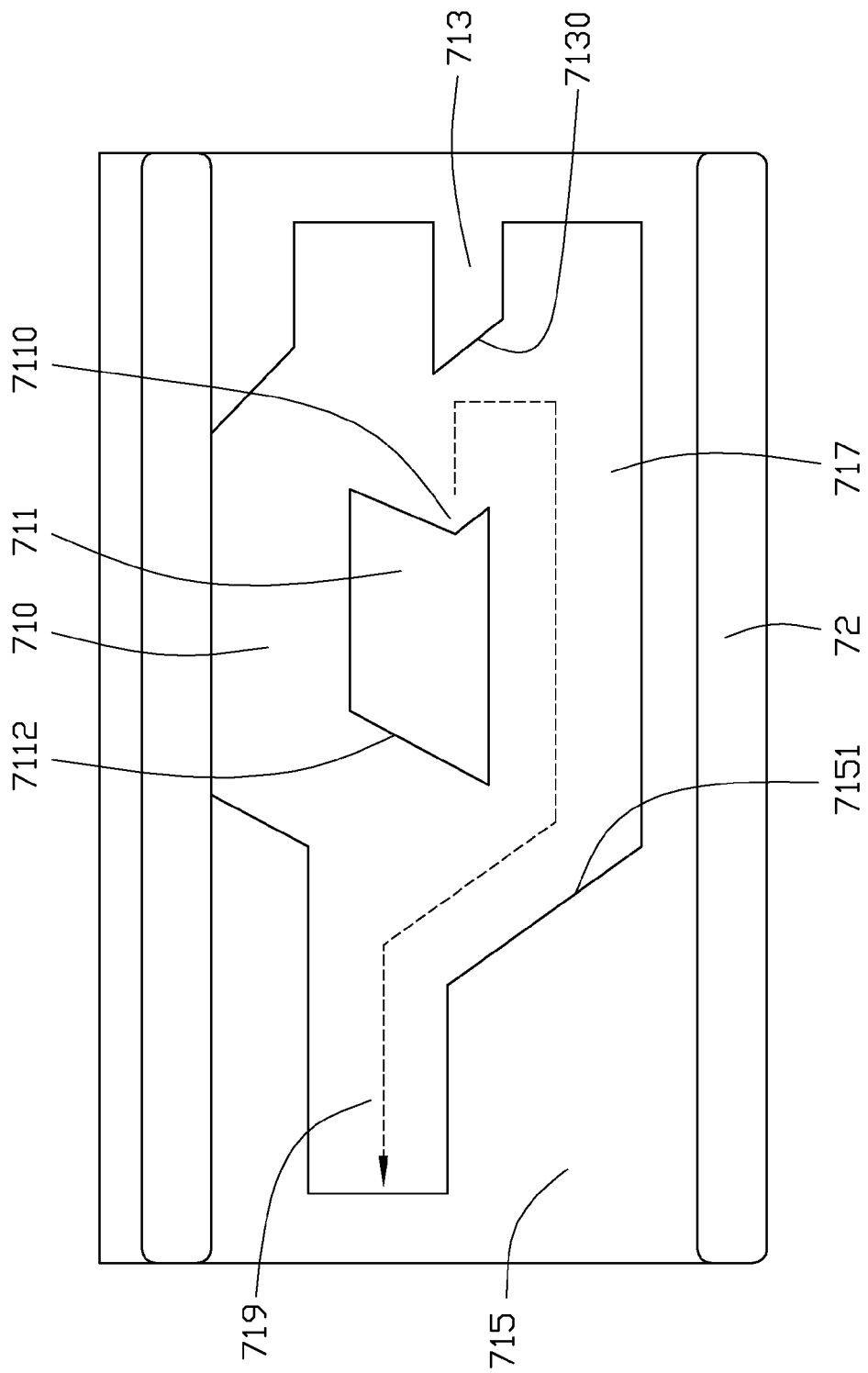
FIG. 10 is a side view of the sliding block showing a second moving path of the elastic positioning member.

Referring to FIG. 6, when the button module 80 is accommodated in the securing bracket 50, the button module cutout 81 receives a corner of the sliding block 70 and abuts the sliding block front wall 73, so that the spring member 90 is resiliently depressed. The elastic positioning member second end 113 engages in the sliding block first securing slot 7110 to retain the sliding block 70 in a first position.

When disengaging the button module 80 from the securing bracket 50, the button module 80 is pushed in first. The elastic positioning member second end 113 disengages from the first securing slot 7110 and abuts the sliding block second oblique plane 7130. The second end 113 is deformed down by the second oblique plane 7130 and is forced to move to the second guiding slot 717. At this time, the button module 80 is released. The spring member 90 rebounds to the normal state, thereby forcing the sliding block 70 to move away from the securing bracket rear wall 57. The elastic positioning member second end 113 slides along the second guiding slot 717 and the sliding block third oblique plane 7151. When the second end 113 slides over the third oblique plane 7151, the elastic positioning member 100 rebounds to a normal state and the second end 113 engages in the second securing slot 719 (see the arrow in FIG. 10). The button module 80 is urged by the sliding block 70 to move out of the securing bracket 50 from a lateral side of the base 10. Then, pulling the button module 80 so that the connecting bar protruding ends 513 insert into the button module slots 87 to establish electrical connection between the button module 80 and the circuit board 30.

When the button module 80 is needed to be secured in the securing bracket 50, the button module 80 is pushed into the base 10. The button module 80 drives the sliding block 70 to move toward the securing bracket rear wall 57. The spring member 90 is resiliently depressed. The elastic positioning member second end 113 moves along the second securing slot 719 and abuts the sliding block first oblique plane 7112. The second end 113 is deformed up by the second oblique plane 7130 and is forced to move to the first guiding slot 710 (see the arrow in FIG. 9). When the second end 113 moves over the first guiding slot 710, the elastic positioning member 100 rebounds to the normal state and locates in the first securing slot 7110, so as to maintain the sliding block in a second position. The positioning bracket elastic positioning member 651 engages in the button module notch 85 to keep the button module in the securing bracket 50.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. An electronic device, comprising:
a base;
a button module comprising a button, the button movably received in the base from a side of the base;
a securing bracket secured to the base, and the securing bracket comprising a sliding protrusion;
a sliding block defining a guiding slot, the sliding protrusion inserted in the guiding slot, and the sliding block being slidable along the guiding slot relative to the securing bracket; and the sliding block further defining a first securing slot and a second securing slot; and
an elastic positioning member engagable in the first securing slot to restrict the sliding block in a first position where the button module is received in the base, and engagable in the second securing slot to restrict the sliding block in a second position where the button module extends out of the base.

2. The electronic device of claim 1, wherein the sliding block is resiliently disposed in the securing bracket, and is capable of urging the button module to extend out of the base.

3. The electronic device of claim 1, wherein the securing bracket comprises a plurality of connecting bars electrically connected to a circuit board, each of the connecting bars forming a protruding end, the button module defines a plurality of slots, and the connecting bar protruding ends is inserted in the slots so as to establish electrically connect the button module and the circuit board.

4. The electronic device of claim 1, wherein the elastic positioning member comprises a first end and a second end, the first end is fixed on the securing bracket, and the second end is received in the sliding block.

5. The electronic device of claim 4, wherein a spring is disposed between the sliding block and the securing bracket, the sliding block is capable of being maintained at the first position when the spring is stretched, and at a second position when the spring is depressed.

6. The electronic device of claim 4, wherein a first blocking block protrudes from the sliding block, the first securing slot is defined in one side of the first blocking block, the other side of the first blocking block defines a first oblique plane configured to force the elastic positioning member second end to move up along the first oblique plane to a position above the first blocking block.

7. The electronic device of claim 6, wherein the sliding block comprises a second blocking block defining a second oblique plane whose oblique direction is reverse to that of the first oblique plane, the second oblique plane is configured to guide the elastic positioning member second end to move down to a position below the first blocking block.

8. The electronic device of claim 1, wherein the button module defines a notch; a positioning bracket is secured in the base, and the positioning bracket comprises a positioning member engaged in the notch to restrict the button module in the base.

9. The electronic device of claim 8, wherein a blocking protrusion protrudes from the button module, the positioning bracket comprises a blocking member engaging with the blocking protrusion to prevent the button module disengaging from the base.

10. An electronic device, comprising:
a base accommodating a circuit board;
a securing bracket disposed on the circuit board, a sliding block resiliently received in the securing bracket; and
a button module movably received in the securing bracket, the sliding block slidable in the securing bracket to force the button module to extend out from a side of the base, and the bottom module defining a notch; and a positioning bracket mounted in the base and covering the securing bracket, and the positioning bracket comprising a positioning member engaged in the notch to restrict the button module in the securing bracket.

11. The electronic device of claim 10, wherein the securing bracket comprises a plurality of connecting bars electrically connected to the circuit board, each of the connecting bars forming a protruding end, the button module defines a plurality of slots, and the connecting bar protruding ends is inserted in the slots.

12. The electronic device of claim 11, wherein the electronic device further comprises an elastic positioning member having a first end and a second end, the first end is fixed on the securing bracket, and the second end received in the sliding block.

13. The electronic device of claim 12, wherein a spring is disposed between the sliding block and the securing bracket, the sliding block is capable of being restrained at a first position where the spring is stretched, and at a second position where the spring is depressed.

14. The electronic device of claim 13, wherein the sliding block comprises a first securing slot and a second securing slot; the second end of the elastic positioning member is received in the first securing slot to restrain the sliding block in the first position, and the second end of the elastic positioning member is received in the second securing slot to restrain the sliding block in the second position.

15. The electronic device of claim 14, wherein a first blocking block protrudes from the sliding block, the first securing slot is defined in one side of the first blocking block, the other side of the first blocking block defines a first oblique plane configured to force the elastic positioning member second end to move up along the first oblique plane to a position above the first blocking block.

16. The electronic device of claim 15, wherein the sliding block comprises a second blocking block defining a second oblique plane reverse to the first oblique plane, the second oblique plane is configured to guide the elastic positioning member second end to move down to a position below the first blocking block.

17. The electronic device of claim 10, wherein a blocking protrusion protrudes from the button module, the positioning bracket comprises a blocking member engaging with the blocking protrusion to prevent the button module disengaging from the base.

18. The electronic device of claim 8, wherein the sliding block comprises a top wall facing the positioning bracket, and a blocking flange extends from a side edge of the top wall; the securing bracket comprises a securing hook, and the securing hook is engaged with the blocking flange.

19. The electronic device of claim 10, wherein the sliding block comprises a top wall facing the positioning bracket, and a blocking flange extends from a side edge of the top wall; the securing bracket comprises a securing hook, and the securing hook is engaged with the blocking flange.

* * * * *